United States Patent [19]

Fuchs et al.

[11] Patent Number: 4,889,704
[45] Date of Patent: Dec. 26, 1989

[54] PREPARATION OF HYDROXYLAMMONIUM SALTS

[75] Inventors: Hugo Fuchs; Josef Ritz, both of Ludwigshafen; Erwin Thomas, Freinsheim; Franz-Josef Weiss, Neuhofen, all of Fed. Rep. of Germany

[73] Assignee: BASF Aktiengesellschaft, Ludwigshafen, Fed. Rep. of Germany

[21] Appl. No.: 184,085

[22] Filed: Apr. 20, 1988

[30] Foreign Application Priority Data

Apr. 24, 1987 [DE] Fed. Rep. of Germany ....... 3713733

[51] Int. Cl.$^4$ .................. C01B 21/087; C01B 21/088; C01B 21/093
[52] U.S. Cl. .................................... 423/387; 423/388; 502/185; 502/339
[58] Field of Search ................ 423/387, 388; 502/185, 502/339

[56] References Cited

U.S. PATENT DOCUMENTS

| | | |
|---|---|---|
| 2,719,778 | 10/1955 | Jockers et al. ............... 423/387 |
| 2,823,101 | 2/1958 | Jockers et al. . |
| 3,060,133 | 10/1962 | Jockers et al. . |
| 3,133,790 | 5/1964 | Jockers ....................... 423/388 |
| 3,145,082 | 8/1964 | Rausch et al. ................ 423/387 |
| 3,406,011 | 10/1968 | Zirngibl et al. .............. 423/387 |
| 3,767,758 | 10/1973 | Mars et al. .................. 423/387 |
| 3,856,924 | 12/1974 | Kartte et al. . |
| 3,956,469 | 5/1976 | El-Ghatta et al. ............ 423/387 |
| 3,996,165 | 12/1976 | El-Ghatta et al. . |
| 4,048,291 | 9/1977 | El-Ghatta et al. . |
| 4,659,683 | 4/1987 | Biffar et al. ................. 423/387 |

FOREIGN PATENT DOCUMENTS

| | | | |
|---|---|---|---|
| 253712 | 5/1963 | Australia ..................... | 423/388 |
| 2542421 | 4/1976 | Fed. Rep. of Germany ...... | 423/387 |
| 7703020 | 9/1978 | Netherlands ................. | 423/387 |
| 960459 | 6/1964 | United Kingdom ............. | 423/387 |

OTHER PUBLICATIONS

Chapter III in Dwyer and Mellor "Chelating Agents and Metalchelates" Academic Press London (1965), pp. 95–181.

Primary Examiner—Robert L. Stoll
Assistant Examiner—Wayne A. Langel
Attorney, Agent, or Firm—Keil & Weinkauf

[57] ABSTRACT

Hydroxylammonium salts are prepared by catalytic reduction of nitrogen monoxide with hydrogen at elevated temperature in a dilute aqueous solution of a mineral acid in the presence, in suspension, of a supported platinum catalyst obtainable by precipitating metallic platinum from an aqueous platinum solution onto a support by means of a reducing agent in the presence of an organic chelating agent and partially poisoned with sulfur.

5 Claims, No Drawings

PREPARATION OF HYDROXYLAMMONIUM SALTS

Hydroxylammonium salts are now prepared in industry by reducing nitrogen monoxide with hydrogen in the presence of suspended platinum catalysts in aqueous mineral acids. There is much prior art concerned with affecting the activity of the platinum catalyst used in such a way that the reduction of nitrogen monoxide leads to the formation of hydroxylammonium salts and stops short of byproducts such as ammonium salts or dinitrogen oxide.

For instance, German Pat. 956,038 discloses poisoning platinum catalysts with sulfur, selenium, arsenic or tellurium in order that the formation of hydroxylammonium salts be favored. Similarly, the processes described in German Pat. 2,100,036 and German Laid-Open Application DOS 2,500,866 represent an attempt to improve the yield of hydroxylammonium salts by poisoning the platinum catalysts used with sulfur. However, these processes are still in need of improvement.

In German Laid-Open Application DOS 2,520,734, the platinum catalysts used for reducing nitrogen monoxide with hydrogen in aqueous mineral acids have been poisoned with selenium. However, this process has the disadvantage that the catalyst so poisoned is only effective at acid concentrations above 2N. As a consequence, the reaction has to be discontinued at an acid concentration of 2N, and appreciable amounts of residual mineral acid are present in admixture with hydroxylammonium salts. If the hydroxylammonium salts are to be converted into oximes, this acid content is very much an interfering presence.

German Pat. 1,088,037 represents an attempt to improve the preparation of platinum catalysts by stepwise reduction of platinum IV via platinum II compounds and precipitation of metallic platinum onto supports in order to steer the reduction of nitrogen monoxide in the desired direction. However, it proved to be the case that these catalysts, like those mentioned above, on prolonged use become diminished in activity and give rise to the formation of increased amounts of byproducts.

It is an object of the present invention in the field of preparation of hydroxylammonium salts by catalytic reduction of nitrogen monoxide with hydrogen to modify the catalysts in such a way that the formation of byproducts is as far as possible suppressed, even at low acid concentrations, and that they show improved activity for a longer period.

We have found that this object is achieved in a process for preparing a hydroxylammonium salt by catalytic reduction of nitrogen monoxide with hydrogen at elevated temperature in a dilute aqueous solution of a mineral acid in the presence, in suspension, of a supported platinum catalyst which is obtainable by precipitating metallic platinum from an aqueous platinum solution onto a support by means of a reducing agent in the presence of an organic chelating agent and which has been partially poisoned with sulfur.

The novel process has the advantage that the formation of byproducts in the synthesis of hydroxylamine is substantially suppressed and the catalyst used retains this property even at acid concentrations below 2N. The novel process has the further advantage that the catalyst used has a longer life.

In general, a molar ratio of hydrogen:nitrogen monoxide of from 1.5:1 to 6:1 is maintained. Particularly good results are obtained by taking care to ensure that a molar ratio of hydrogen:nitrogen monoxide of from 3.5 to 5:1 is maintained in the reaction zone.

Advantageously, the acid used is a strong mineral acid, such as hydrochloric acid, nitric acid, sulfuric acid or phosphoric acid. It is also possible to use acid salts thereof, such as ammonium bisulfate. Particular preference is given to sulfuric acid, ammonium bisulfate or nitric acid. In general, the aqueous acid is initially from 4- to 6-normal and in the course of the reaction is never allowed to drop below 0.2 normal.

The reaction is advantageously carried out at from 30° to 80° C. Good utility is ensured at from 40° to 60° C. In general, the reaction is carried out under atmospheric pressure or under superatmospheric pressure, for example at up to 30 bar. Good utility is ensured with the method of working according to the invention when the reaction is carried out under superatmospheric pressure, for example at from 1.5 to 20 bar.

The reaction is carried out in the presence of a supported platinum catalyst. Particularly good utility is possessed by platinum on carbon supports, for example active carbon, in particular graphite. Preferably, such a supported catalyst contains from 0.1 o 5% by weight of platinum, in particular from 0.3 to 0.6% by weight of platinum. It is advantageous to use supported platinum catalysts whose <10 $\mu$m particle size fraction is not more than 10% by weight. Preference is given to using a supported platinum catalyst having a particle size from 30 to 90 $\mu$m. Catalyst fines can easily be removed by suitable measures, for example sieving.

The supported platinum catalyst used has been partially poisoned with sulfur. Advantageously, the sulfur content is from 1 to 50 atom %, in particular from 3 to 30 atom %, based on the platinum metal used. The sulfur can be added to the catalyst in the course of the preparation of the catalyst in the form of suitable compounds, such as alkali metal dithionite, alkali metal sulfide, derivatives of sulfoxylic acid with formaldehyde, sulfurous acid or alkali metal sulfite, which are reduced to sulfur in the course of the reduction. The reducible sulfur compound can also be added to the platinum metal containing catalyst after the latter has been prepared.

Advantageously, the supported platinum catalyst used additionally contains selenium as a poisoning agent. Advantageously, the selenium content is from 0.1 to 10 atom %, in particular from 0.5 to 5 atom %. Selenium can be added to the catalyst in the course of the preparation of the latter or to the ready-prepared catalyst in the form of a suitable compound such as selenium dioxide, selenous acid or selenic acid, which is reduced to selenium in the course of the reduction.

According to the invention, the catalyst used is obtainable by precipitating metallic platinum from an aqueous platinum solution onto a support by means of a reducing agent in the presence of an organic cheating agent. In general, the starting point here is an aqueous solution of hexachloroplatinic acid or tetrachloroplatinic acid or a salt thereof. Advantageously, the solution is brought to pH 4.6–6, for example by adding an alkali metal hydroxide, before the cheating agent is added. Particular good utility is ensured if the solution is buffered to the stated pH, for example by adding an alkali metal acetate also. Such a platinum containing solution is admixed with an organic cheating agent in particular with a low molecular weight chelating agent having a molecular weight of up to 500. It is advantageous to use from 0.1 to 2 ol %, in particular from 0.1 to 1.5 mol %, of organic chelating agent based on platinum. In general, the organic chelating agent used is from 2- to 4-dentate.

Suitable chelating agents are for example α- or β-hydroxycarbonyl compounds such as hydroxycarboxylic acid, hydroxy ketones or hydroxy aldehydes. Examples are glycolic acid and salicylic acid. Also suitable are aminocarboxylic acids, in particular α- or β-aminocarboxyaminocarboxylic acids, such as glycine or serine. Also suitable are 1,3-diketones such as acetylacetone. Other suitable chelating agents are 2,2-dipyridyl, 1,10-phenanthroline or 1,2-diamines such as ethylene diamine and analogous diamines. Also suitable are o-aminophenol and hydroxyl containing aromatic amines such as 8-hydroxyquinoline or 8-hydroxyquinaldine. Further suitable chelating agents are hydroxyaldoximes such as salicylaldoxime or hydroxyketoximes such as o-hydroxyacetophenone oxime. Suitable chelating agents further comprise aminopolycarboxylic acids such as nitrilotriacetic acid, ethylenedinitrilotetraacetic acid, ethylenedinitrilotetraacetic acid in the form of the said disodium salt and also cyclohexane-1,2-dinitrilotetraacetic acid and diethylenetriaminepentaacetic acid. Preferred chelating agents are aminopolycarboxylic acids. Suitable chelating agents are described in Dwyer and Mellor "Chelating Agents and Metal Chelates" Academic Press London 1965, pp. 95–181.

The support to be employed is suspended in the platinum-containing solution. The support can be introduced at the start or prior to the precipitation of the soluble platinum by means of reducing agent. It proved to be advantageous to suspend the support from the start in the platinum-containing aqueous solution. Metallic platinum is precipitated onto the support by means of a reducing agent which reduces platinum as far as metallic platinum. Suitable reducing agents are for example hydrazine, formaldehyde, formic acid and formates. The use of formic acid has particularly good utility. Advantageously, from 100 to 1,000 moles of reducing agent are used per g-atom of platinum. Advantageously, a temperature of from 60 to 90° C. is maintained in the reduction to metallic platinum. After the reduction has ended, the suspended catalyst is filtered off and advantageously washed with water.

A particularly suitable procedure comprises neutralizing a hexachloroplatinate solution to pH 4.6–6.0, adding sodium acetate buffer, reducing the 4-valent platinum to platinum II by addition of an equivalent amount of dithionite, and adding further dithionite to effect the poisoning with sulfur. In this procedure, the addition of chelating agent and if used selenium compound as further poisoning agent can take place to the buffered solution before or after the reduction to platinum II, and the precipitation of metallic platinum on to the support material by means of a strong reducing agent is carried out afterwards.

In the preparation of hydroxylammonium nitrate it has proved to be particularly suitable to treat a suspension of catalyst in water with hydrogen before the start of the reaction, to maintain a nitric acid concentration of from 1 to 2 equivalents per liter during the course of the reaction by the addition of nitric acid, and permitting the concentration of free acid to drop to 0.1–0.3N at the end of the reaction. A suitable method of working is described for example in German Pat. No. 2,100,036.

Hydroxylammonium salts are suitable for preparing oximes, for example cyclohexanone oxime, an important starting material for caprolactam.

The process of the invention will be illustrated in the following Examples:

EXAMPLE 1

640 g of graphite are twice purified at room temperature with 10% strength $HNO_3$, dried, and then stirred overnight at 80° C. together with 500 ml of $H_2O$, 100 ml of nitrohydrochloric acid and 8.5 g of $H_2[PtCl_6]\cdot 6H_2O$ (3.2 g of platinum).

This is followed by dilution with 400 ml of $H_2O$, cooling down to 30° C., neutralizing with sodium carbonate to pH 5.2 and buffering with sodium acetate. 31.4 mg of nitrilotriacetic acid, dissolved in a little $H_2O$, are then added. Sufficient sodium dithionite solution is then added until $Pt^{4+}$ has been reduced to $Pt^{2+}$. To poison the catalyst with sulfur, sodium dithionite is added in an excess of 20 mol % above and beyond the amount required for reducing $Pt^{4+}$ to $Pt^{2+}$. The platinum is then precipitated at 80° C. onto the graphite by means of 100 ml of 99% strength formic acid, and the platinum on graphite is filtered off and washed with water.

250 g of the platinum-graphite catalyst prepared in this way are suspended in 3,500 ml of distilled $H_2O$ in a stirred stainless steel kettle. Following activation of the catalyst with $H_2$ at 40° C., 500 ml of 63% strength $HNO_3$ are added, and 230 (S.T.P.) of a mixture of 63% by volume of $H_2$ and 37% by volume of 96% pure nitrogen monoxide (the remainder being nitrogen) are then passed in with stirring per hour. The reaction temperature is 40°–42° C. A further 1,380 ml of 63% strength $HNO_3$ are added to maintain a free acid concentration of from 1.5 to 1.8N.

The addition of a total of 1,638 (S.T.P.) of the $NO/H_2$ mixture gives 5.83 of a hydroxylammonium nitrate solution containing 25.8 g/l of free $HNO_3$, 114.1 g/l of $NH_2OH$ (as $NH_3OHNO_3$) and 2.8 g/l of $NH_3$, bound as $NH_4NO_3$. A total of 305 (S.T.P.) of off-gas are obtained comprising 77.3% by volume of $H_2$, 11.5% by volume of NO, 5.0% by volume of $N_2O$ and 6.2% by volume of $N_2$. The yield is based on converted NO and is 92.2 mol % for $NH_2OH$.

EXAMPLE 2

640 g of graphite were purified twice at room temperature with 10% strength $HNO_3$, dried and then stirred overnight at 80° C. together with 500 ml of $H_2O$, 100 ml of nitrohydrochloric acid in 8.5 g of $H_2[PtCl_6]6H_2O$. This is followed by dilution with 400 ml of $H_2O$, cooling down to 30° C., neutralization with sodium carbonate to pH 5.2 and then buffering with crystalline sodium acetate. 18.2 mg of selenium (as $SeO_2$ dissolved in a little $H_2O$) are then added. 31.4 mg of nitrilotriacetic acid, dissolved in a little $H_2O$, are then added, sufficient sodium dithionite solution is then added until $Pt^{4+}$ has been reduced to $Pt^{2+}$ and an excess of sodium dithionite is then added as in Example 1. This is followed by reduction with 100 ml of 99% strength formic acid to PtO. 250 g of the platinum-graphite catalyst prepared in this way are suspended in 4,500 ml of distilled $H_2O$ in the stirred stainless steel kettle. Following activation of the catalyst with $H_2$ at 40° C., 700 ml of 63% strength $HNO_3$ are added, and 160 (S.T.P.) of a mixture of 66% by volume of $H_2$ and 34% by volume of 96% pure nitrogen monoxide (the remainder being nitrogen) are then passed in with stirring per hour. The reaction temperature is maintained at 40–42° C. A further 2,000 ml of 63% strength $HNO_3$ are then added to maintain a free acid concentration of from 1.5 to 1.8 N. The introduction of a total of 2,230 (S.T.P.) of the $NO/H_2$ mixture gives 8.25 of hydroxylammonium nitrate solution containing 20.2 g/l of free $NHO_3$, 127.6 g/l of $NH_2OH$ (as $NH_3OHNO_3$) and 2.4 g/l of $NH_3$, bound as $NH_4NO_3$. A total of 550 l (S.T.P.) of off-gas is obtained comprising 78.3% by volume of $H_2$, 13.6% by volume of NO, 3.6% by volume of $N_2O$ and 4.5% by volume of $N_2$. The $NH_2OH$ yield based on converted NO is 88.9 mol %.

We claim:

1. In a process for preparing a hydroxylammonium salt by the catalytic reduction of nitrogen monoxide with hydrogen at elevated temperature in a dilute aqueous solution of a mineral acid and in the presence, in suspension, of a supported platinum catalyst, the improvement which comprises: preparing said supported platinum catalyst, by
   (a) adding to an aqueous solution of a platinum salt containing a suspended support
      (i) a sulfur compound selected from the group consisting of alkali metal dithionite, alkali metal sulfide, sulfurous acid, alkali metal sulfite and derivatives of sulfoxylic acid with formaldehyde, and
      (ii) an aminopolycarboxylic acid,
   (b) precipitating platinum on the support from said aqueous solution by adding a reducing agent, and
   (c) separating the supported platinum catalyst from the aqueous solution containing said aminopolycarboxylic acid.

2. The process of claim 1, wherein from 0.1 to 1.5 mol % of an aminopolycarboxylic acid based on platinum metal is added in step (a).

3. The process of claim 1, wherein the aminopolycarboxylic acid is nitrilotriacetic acid.

4. The process of claim 1, wherein the aminopolycarboxylic acid is added to an aqueous platinum solution buffered to pH 4.6–6.0.

5. The process of claim 1, wherein additionally a selenium compound selected from the group consisting of selenium dioxide, selenous acid and selenic acid is added in step (a).

* * * * *